United States Patent [19]

Gibbon et al.

[11] Patent Number: 4,675,378

[45] Date of Patent: Jun. 23, 1987

[54] PROCESS CONTROL SYSTEM

[75] Inventors: John D. Gibbon; Virgil J. Adkins, Jr., both of Charlotte, N.C.

[73] Assignee: Celanese Corporation, New York, N.Y.

[21] Appl. No.: 864,658

[22] Filed: May 19, 1986

[51] Int. Cl.⁴ ............................................. C08G 63/02
[52] U.S. Cl. ................................. 528/272; 528/308.1; 528/308.2; 528/308.3; 528/480
[58] Field of Search .................. 528/272, 308.1–308.8, 528/480

[56] References Cited

U.S. PATENT DOCUMENTS 4,072,663   2/1978   Pendlebury ...................... 528/308.5
4,237,261  12/1980   Kawamura et al. ................ 528/272
4,362,852  12/1982   Pendlebury et al. ............... 528/272

*Primary Examiner*—Lucille M. Phynes
*Attorney, Agent, or Firm*—Forrest D. Stine

[57] ABSTRACT

An apparatus and process for the continuous manufacture of high stress, high denier industrial yarn spun from polyethylene terephthalate polyester. A control system continuously measures melt viscosity of the polymer both at the outlet from a polymerization zone and at a downstream location adjacent a manifold immediately preceding a plurality of spinnerettes through which the polymer is drawn into filamentary material. Adjustments are continuously made to a meaningful operating condition within the polymerization zone, such as the magnitude of the vacuum therein, whenever IV inferred from operating data strays from a pre-established level. Adjustments are also regularly made at discrete short term intervals, for example, minute by minute, whenever viscosity at the outlet from the polymerization zone strays from the pre-established level. Additionally, adjustments are made to that pre-established level of viscosity whenever viscosity at the downstream location varies substantially from the norm after a moderate lapse in time, which may vary, for example, between one-half hour and eight hours in duration.

19 Claims, 3 Drawing Figures

PROCESS CONTROL SYSTEM

BACKGROUND OF THE INVENTION present invention relates to a continuous process for producing yarn of polyethylene terephthalate polyester and, more particularly, to an improved process for producing high denier high stress industrial yarn by controlling variations of intrinsic viscosity of the molten polymer. However, other polymers produced by similar processes, for example, polycondensation reactions, copolyesters, and the like, could utilize the concepts disclosed herein.

Throughout this disclosure, the term "intrinsic viscosity" shall be taken to be a measure, within limits, of the sought after quality of the polymer being produced. The melt-spinnable polyester for use in the present process prior to extrusion is selected to have an intrinsic viscosity (IV) of about 0.5 to 2.0 deciliters per gram, and preferably a relatively high intrinsic viscosity of 0.8 to 1.0 deciliters per gram, and most preferably 0.85 to 0.94 deciliters per gram. The IV of the melt-spinnable polyester may be conveniently determined by the equation $$\lim_{c \to 0} \frac{\ln \eta r}{c}$$

where $\eta r$ is the "relative viscosity" obtained by dividing the viscosity of a dilute solution of the polymer by the viscosity of the solvent employed (e.g. orthochlorophenol) measured at the same temperature, and c is the polymer concentration in the solution expressed in grams/100 ml. The starting polymer additionally commonly exhibits a degree of polymerization of about 140 to 420, and preferably of about 140 to 180. The polyethylene terephthalate starting material commonly exhibits a glass transition temperature of about 75° to 80° C. and a melting point of about 250° to 265° C., e.g. about 260° C.

Also, it should be recognized that there is a direct relationship between intrinsic viscosity (IV) and molecular weight of the polymer being produced. This relationship is clearly shown as follows:

$$IV = 1.7 \times 10^{-3} \times (\text{no. avg. mol. wt.})^{0.83}$$

where the parenthetical phrase "no. avg. mol. wt.", that is, "number average molecular weight" means $$\overline{Mn} = \frac{\Sigma n_i m_i}{\Sigma n_i}$$

where $m_i$ is the molecular weight of molecule $n_i$ or the total weight of molecules divided by the number of molecules. Hence, the higher the molecular weight, within limits, the better the quality of the resulting product.

The present invention is principally concerned with improving known processes of producing high stress spun yarns for industrial purposes. Industrial yarns are heavy duty yarns and are used, for example, in the formation of tire cord, conveyor belts, seat belts, V-belts, hosing, sewing thread, carpets, and the like, and have properties of strength and tenacity which greatly exceed those characteristics of textile yarns used for clothing and normal household furnishings. Known processes relating to the production of such high stress spun yarns are disclosed in the U.S. Pat. No. 4,101,525 to Davis et al issued July 18, 1978 and U.S. Pat. No. 4,195,052 to Davis et al issued Mar. 25, 1980, as well as McClary U.S. Pat. No. 4,414,169 issued Nov. 8, 1983. As noted in those patents, a polymer having an IV of about 0.35 to 0.70 deciliters per gram is commonly selected when forming textile yarns and a polymer having an IV of about 0.7 to 1.0 deciliters per gram is commonly selected when forming industrial yarns.

It has long been known that there is a close correlation between control of IV and production of a homogeneous polymer having good uniform quality. It is for such a purpose that the U.S. Pat. Nos. 3,878,379 and 4,106,098, to Moody, Jr. et al, U.S. Pat. No. 4,153,766, to Koide and U.S. Pat. No. 4,237,261 to Kawamura et al, all provide viscometers between each of the various stages or reactors of a cascade system for continuously producing polyethylene terephthalate polyester. In each instance, the viscometers are arranged to provide feedback and/or feedforward signals to adjacent reactors. Control is achieved by making adjustments to set points of operating parameters in each reactor of set points based on a variety of factors, including pressure, agitator speed, inlet and outlet melt viscosity, inlet and outlet temperatures, internal temperature of a reactor, flow rate, and pump speed. The Moody, Jr. et al and Koide et al patents claim to hold variations of IV to within +/−0.005 IV units.

According to the U.S. Pat. No. 3,493,345, to Windley, changes in the amount of power consumed by a motor driving a mechanical pump or mixing blade during the production process are detected and necessary adjustments made accordingly to control viscosity. Control is similarly disclosed in U.S. Pat. No. 3,502,622, to Reichel et al, according to which melt viscosity of the preliminary condensation product is continuously measured. In that patent disclosure, if there is excessive variation of the melt viscosity, alcohol or other solvent is added to the production system through a controlled metering device.

Of particular note is the process disclosed in the patent to U.S. Pat. No. 3,503,937 to Allen et al. The Allen et al process utilizes a pair of viscometers, one having a probe positioned in the pipeline near the outlet from the separation vessel and a second having a probe positioned downstream of the first probe and near the spinning unit. When the viscosity at the second probe differs from a desired viscosity level manually established at a controller, a signal is transmitted to the controller to adjust the preestablished level by altering the vacuum within the vessel. The Allen et al patent recites a relative viscosity of the polymer so produced as being within 0.25 relative viscosity units of the desired level 95 percent of the time.

SUMMARY OF THE INVENTION

The present invention is directed to improvements in apparatus and processes employed for the continuous manufacture of a polyester of substantially constant IV and particularly for polyethylene terephthalate polyesters having an end use as high denier high stress industrial yarns. According to the invention, the control system is based on the correlation between intrinsic viscosity and melt viscosity, melt viscosity being dependent upon intrinsic viscosity and temperature of the molten polymer. In this regard it is noteworthy that one cannot measure, directly, intrinsic viscosity. Rather, the measurement of intrinsic viscosity is a laboratory quality control procedure performed manually on the resulting yarn product at irregular time intervals. Therefore, the results are delayed in time and not readily available for immediate and ongoing application to the continuous process. Instead one measures melt viscosity, relative viscosity, or a specific viscosity.

The control scheme disclosed herein does not require that melt viscosity be converted to intrinsic viscosity. It is simply easier to think of polymer in terms of intrinsic viscosity since the latter is a polymer property not dependent on other variables such as temperature. Nevertheless, there is a relationship between melt viscosity (MV) of the molten polymer and IV which can be determined empirically but may vary depending upon the IV of the polymer. For example, for IVs of polyethylene terephthalate ranging from about 0.8 to about 1.0, the following relationship is substantially correct:

$$IV = \left(\frac{MV}{0.112 * e^{6800/T}}\right)^{0.2} + K$$

where T represents melt temperature in the viscometer in °K.; and K is a calibration constant which is determined experimentally.

Thus, melt viscosity of the polymer is continuously measured both at the outlet from a high polymerizer vessel and at a downstream location adjacent a manifold immediately preceding a plurality of spinnerettes through which the polymer is drawn into filamentary material or yarn. Adjustments are continuously made to a meaningful operating condition within the polymerizer vessel, such as the magnitude of the vacuum therein, whenever IV inferred from operating data strays from a pre-established level. Adjustments are also regularly made at discrete short term intervals, for example, minute by minute, whenever melt viscosity at the outlet from the vessel strays from the pre-established level. Additionally, adjustments are made to that pre-established level of viscosity whenever viscosity at the downstream location varies substantially from the norm after a moderate lapse of time, which may vary, for example, between one half hour and eight hours in duration and continuing for the long duration, that is, for days or weeks.

The invention has been particularly effective in those instances in which it is desired to introduce so-called "endcapping" materials such as: ethylene oxide; 1, 2-epoxypropane; 1, 2-epoxybutane; 1, 2-epoxy-2 methylpropane; 1, 2-epoxy- 3- o-chlorophenoxypropane); and 3-chloro ethyl glycidyl ether to a polyester melt as is sometimes desired when the yarn is to be used for tire cord applications. One benefit of endcapping is to assure that the resulting yarn maintains its strength throughout the manufacturing process. However, it is known that an undesirable side effect of introducing ethylene oxide to the polyester melt is that it sometimes causes greater swings in breakload strength variability of the resultant yarn. Examples of processes which include the introduction of endcapping materials to a polyester melt are disclosed in the U.S. Pat. No. 4,016,142, to Alexander et al, and to U.S. Pat. No. 4,442,058 to Griffith et al.

Continued testing has made it clear that the invention is effective in controlling the variability of IV even when endcapping materials are introduced to the polyester melt. Indeed, with the use of the invention, IV can be controlled to a standard deviation from target of +/−0.001 IV units over an extended period of time of spun high stress high denier industrial polyester yarns.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate some of the embodiments of the invention and, together with the description, serve to explain the principles of the invention in general terms.

DETAILED DESCRIPTION OF THE DRAWINGS

DESCRIPTION OF THE PREFERRED EMBODIMENT

The practical application of the high stress spun polyester high denier industrial yarn process such as described in the previously mentioned U.S. Pat. No. 4,414,169 to McClary requires control of several operating parameters in order to target the desired IV.

Prior to the present invention, it was considered to be adequate for production of high denier industrial yarns if IV control varied as much as +/−0.01 IV units of target, for example, 0.92 IV units. In accordance with the present invention IV is controlled to a standard deviation of 0.001 IV units.

Figure 1:
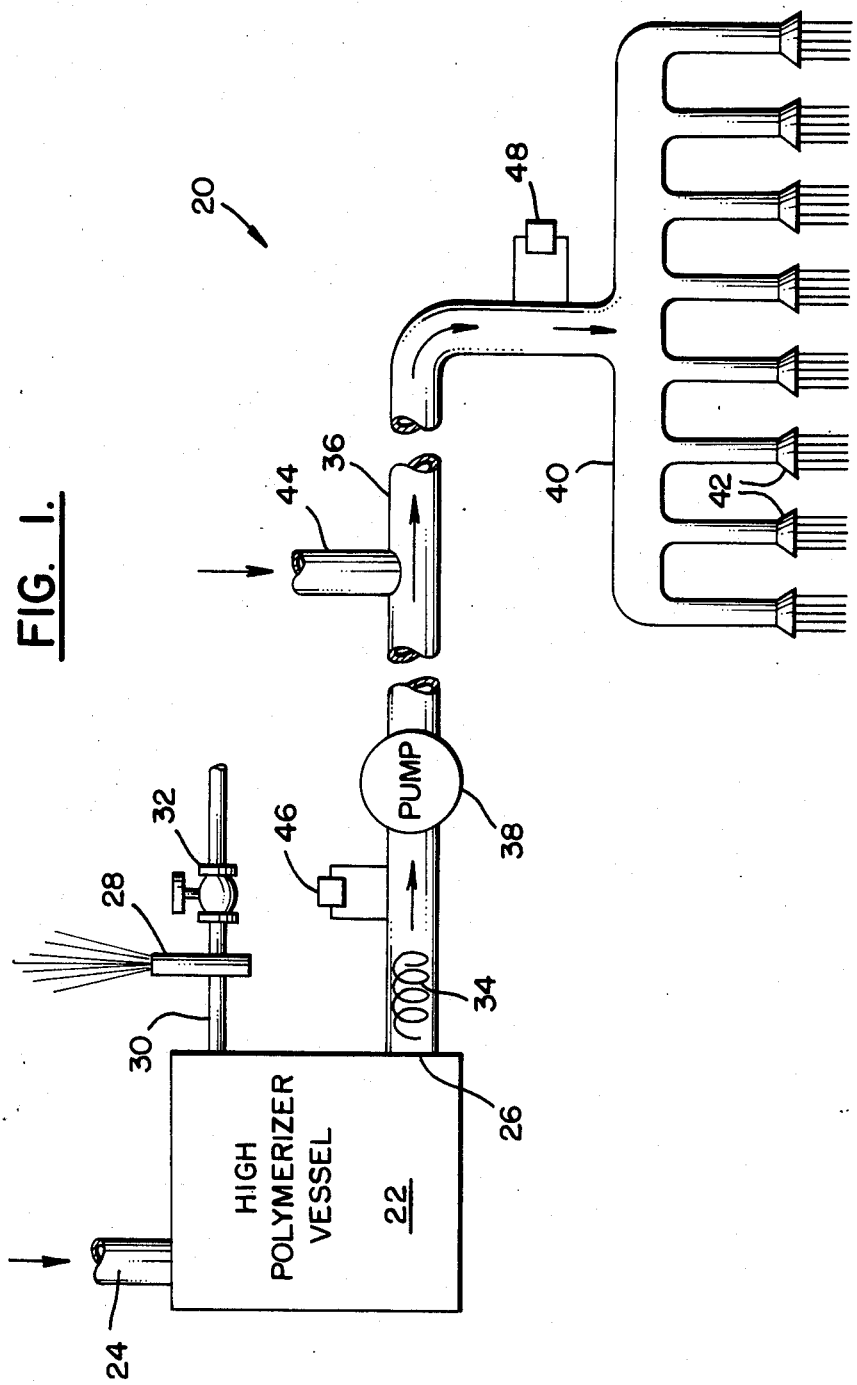
FIG. 1 is a schematic representation of a continuous process utilizing the invention for the production of high stress high denier industrial yarn spun from polyethylene terephthalate polyester.

Turn now to the drawings and, initially, to FIG. 1 which schematically represents the essential components and polymer flow for the continuous production of high stress high denier industrial yarns manufactured from polyethylene terephthalate polyester. In FIG. 1 then, low IV polyethylene terephthalate polymer is introduced into a high IV polymerizer vessel 22 via an appropriate inlet 24. As the polymerization process proceeds in vessel 22, small amounts of glycol are removed from the substance introduced to the vessel via conduit 30 resulting in a polymer with an ever higher IV until, when it reaches an outlet 26, it achieves a preferred level of IV of approximately 0.92 deciliters per gram. During this process, according to the relationship noted above, the molecular weight of the polymer increases simultaneously with the increase in intrinsic viscosity.

The polymerization process within the vessel 22 can be controlled by a variety of known methods. These include temperature, adjusting the level of the polymer and thus the residence time within the vessel and adjusting the power input to, and therefore speed of, an agitator within the vessel 22. However, a preferred method is that schematically indicated in FIG. 1 which illustrates a well known technique for controlling vacuum within a high polymerizer vessel. As illustrated, a steam ejector 28 is connected to the vessel 22 by a line 30 and operates to reduce the pressure in the vessel. However, the efficiency of the steam ejector 28 can be reduced as necessary by feeding steam from a valve 32 transversely to the vent stream of the steam ejector.

At the conclusion of the polymerization process, the resulting high polymer is drawn through the outlet 26 by various means, such as, for example, an extractor screw 34 which can be termed a "soft" pump, that is, one which operates generally within the range of 200–400 psi. In this manner the polymer is drawn into a conduit 36 and by suitable means, such as a more powerful "hard" pump 38, that is, one which develops much higher pressures, on the order of 2000 psi, is drawn into a manifold 40 and thence to a plurality of spinnerettes 42 from which is spun filamentary material, that is, the yarn produced by the system 20.

That portion of the system 20 which includes the conduit 36, pump 38, and manifold 40 is sometimes referred to as the distribution portion of the system 20. In a typical operation, the polymer may take approximately 15 to 20 minutes to flow through the distribution portion of the system.

In specialized operations, as in the manufacture of yarns to be used in high stress applications, such as tire cord, it might be desirable to inject an endcapping material via a second inlet 44 to the conduit 36 downstream from the pump 38 but before the polymer reaches the manifold 40. As noted above, typical endcapping materials include: ethylene oxide; 1, 2 - epoxypropane; 1, 2 - epoxybutane; 1, 2 - epoxy - 2 methylpropane; 1, 2 - epoxy - 3 - (o-chlorophenoxypropane); and 3 - chloro ethyl glycidyl ether.

Of particular importance to the invention is the placement of a pair of viscometers, 46 and 48, respectively, which are appropriately attached to the conduit 36 and include suitable probes positioned internally of the conduit. A first viscometer 46 is mounted between extractor screw 34 and the pump 38. The extractor screw 34 operates adjacent the outlet 26 from the vessel 22. A second viscometer 48 is mounted to the conduit 36 at a location downstream from the first viscometer 46 and adjacent the manifold 40. Indeed, it is preferable to place the viscometer 48 as close as practicable to the spinnerettes 42. In a similar fashion, the first viscometer 46 is placed as close as practicable to the vessel 22 so as to insure as accurate a reading of viscosity as possible at the instant the polymer leaves the vessel 22. Such placement of the viscometer 46 assures that the polymer whose characteristics it is monitoring has not yet been subjected to outside disturbances which are unrelated to conditions within the vessel. One example of a type of viscometer which may be employed by the system 20 might be Model SKR known under the trademark Gottfert and manufactured by Gottfert of Buchen, West Germany.

Figure 2:
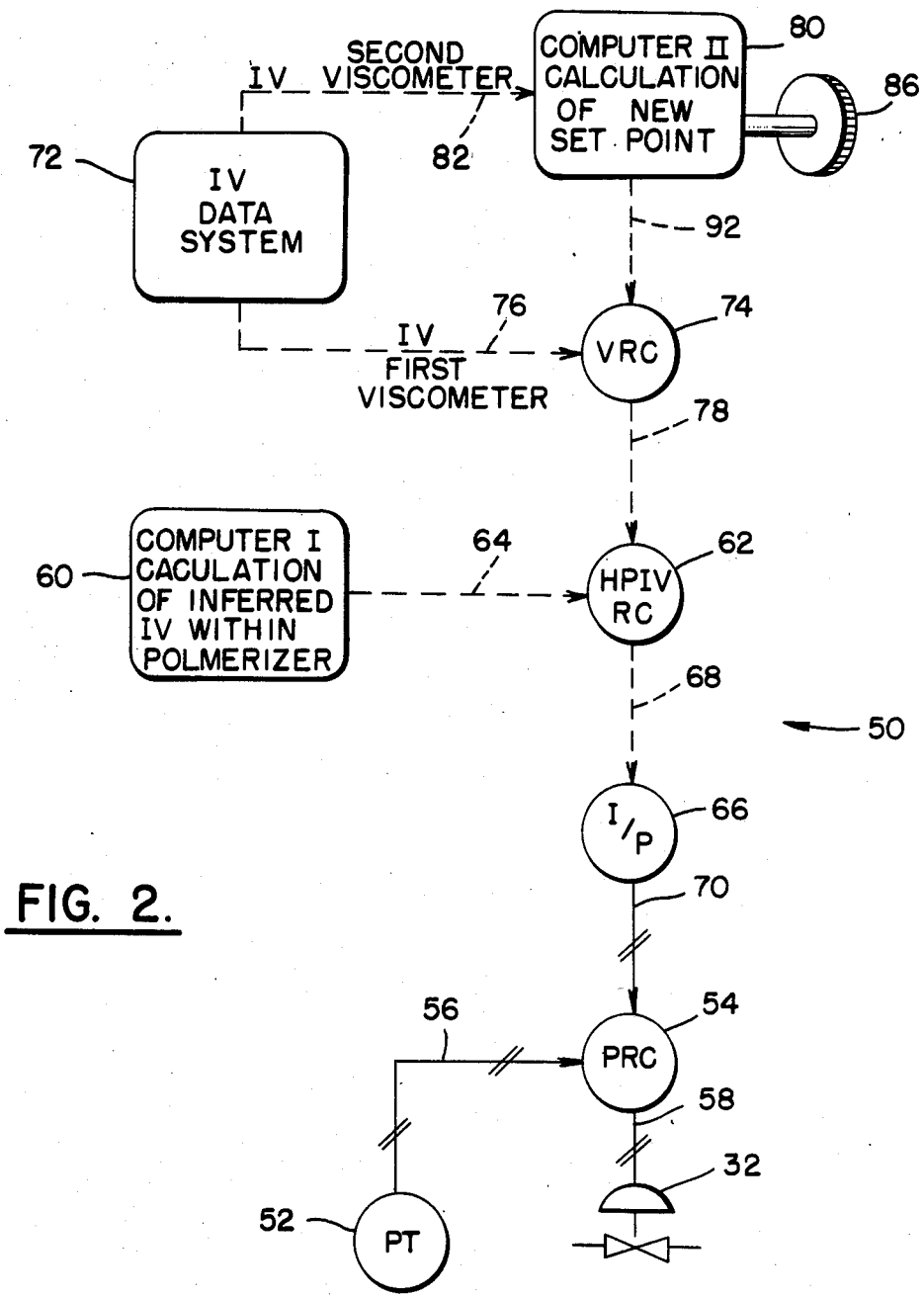
FIG. 2 is a schematic representation of a control system for operating portions of the process illustrated in FIG. 1.

Turn now to FIG. 2 which generally illustrates, schematically, a control system 50 for the production system 20 illustrated in FIG. 1.

An absolute pressure transmitter 52 is located within the high polymerizer vessel 22 and serves to continuously inform a pressure recorder controller 54 of the level of vacuum within the vessel 22. This information is transmitted via a suitable line 56 joining the two devices. Line 56 is illustrated as being pneumatic, but it may be an electrical line or compatible with any other control means. The controller 54, which may be of any suitable type, is connected via a line 58 to the valve 32 which regulates the level of vacuum within the vessel 22. The controller 54, therefore, is operable continuously to adjust the level of vacuum within the vessel 22 as the actual pressure varies from some pre-established norm.

The system 50 also includes a first computer 60 of any suitable design which operates to generate an "inferred" measurement of IV within the high polymerizer vessel 22. Specifically, the computer 60 does not actually measure IV within the vessel 22, but rather computes IV according to known process conditions existing within the vessel. These known process conditions are data fed to the computer and may include, but are not necessarily limited to, inlet level of polymer, temperature, agitator torque, torque of the extractor screw 34, flow rate of the polymer exiting the vessel (i.e. flowing to the spinnerettes), and polymer inventory on the vessel walls as measured by a nuclear absorption sensor. Of these, agitator torque and output of the nuclear absorption sensor are the data most commonly employed.

An output signal of inferred IV within the polymerizer vessel 22 is continuously imparted by the computer 60 to a recorder controller 62 via an electrical line 64. The controller 62 may be of any suitable type, for example, one sold under the trademark $AC^2$ by Fisher Controls of Marshalltown, Iowa. It should be noted that at the outset of operation of the system 50, a target level of inferred IV is initially set into the recorder controller 62 subject to being changed as the process ensues in a manner which will be described below. It is also noteworthy that inferred IV is a value calculated from the control parameters measured and may not correspond totally to IV.

If the signals of inferred IV received from the computer 60 on a continuous basis differ from the target IV set into the recorder controller 62, the latter than changes the signal to a transducer 66 via an electrical line 68. The transducer 66 serves to convert the electrical signal from the recorder controller 62 to a pneumatic signal for transmission to the pressure recorder controller 54 via a pneumatic line 70. The signal which thus arrives at the recorder controller 54 then becomes a set point indicating the desired level of vacuum within the vessel 22 in order to achieve the desired inferred IV of the polymer in the vessel 22.

The signal to the recorder controller 54 from the recorder controller 62 contrasts with the actual level of vacuum as determined by the pressure transmitter 52.

Thus, the recorder controller 54 makes the necessary adjustments to the valve 32 until the signal from the pressure transmitter 52 is coincident with that from the recorder controller 62.

That portion of the control system 50 which has just been described could properly operate the production system 20. However, the portion of the control system 50 described to this point would not provide the very high degree of control over variability in IV which is a foremost goal of the system. This benefit is primarily achieved by those components positioned above the computer 60 and recorder controller 62 as illustrated in FIG. 2.

The heart of the subsystem which achieves this improved benefit is an IV data system 72. In actuality, the IV data system 72 is a microprocessor based instrument system which is electronically connected to the first and second viscometers 46 and 48, respectively. It will be recalled that the viscometers 46 and 48 measure melt viscosity of the molten polymer at their respective stations. Accordingly, it is desirable to translate units of melt viscosity into units of IV. Such a calculation is performed by the data system 72 based upon knowledge of pressure and temperature at the respective locations within the first and second viscometers. One formula which can be programmed into the IV data system 72 for calculating IV from melt viscosity is that recited above. Of course, it will be appreciated that any other appropriate expression correlating IV with melt viscosity can be used and programmed into the IV data system 72.

At discrete short term intervals, perhaps once per minute by way of example, the IV data system 72 informs a viscosity recorder controller 74 of the value of IV of the polymer then present at the first viscometer 46. The controller 74 may be of any suitable type, for example, Model Number TL101, manufactured under the trademark $AC^2$ by Fisher Controls of Marshalltown, Iowa. The signal from the IV data system 72 to the controller 74 is communicated via an electrical line 76 connecting the two components.

At the outset of operation of the system 50, the recorder controller 74 is programmed with a target value or set point which is representative of a desired value of IV. If the signals from the IV data system 72 and reflecting the level of IV at the first viscometer 46 differ from the pre-established set point of the recorder controller 74, then the latter transmits an electronic signal via an electrical line 78 to the recorder controller 62. This signal then establishes a new set point for the recorder controller 62 which thereafter controls the operation of the recorder controller 62 regardless of the information received from the computer 60. This situation follows by reason of the fact that the set point established by the recorder controller 74 is based on an actual reading of viscosity whereas the input received from the computer 60 is only an inferred measurement of viscosity. It will be appreciated that both controllers 62 and 74 are continuous in their operation, both in time and with respect to the magnitude of the electrical current signals they work with.

As presently described, the control system 50 operates to control the valve 32 based (1) on continuous information received from the pressure transmitter 52 and (2) on continuous information received from the computer 60 and (3) on changed continuous signals received from the IV data system 72. A subsystem for developing intermediate and long term information which can be used to further adjust the system to accomodate appropriate variations of IV occurring during that time range will not be described.

Specifically, a second computer 80 is electronically coupled to the IV data system 72 by means of an electrical line 82. The computer 80 which may be of any suitable type such as Model Number 50 KM 1000 manufactured under the trademark "Chameleon" by Fischer & Porter of Warminster, PA operates to calculate a new set point for operation of the recorder controller 74 when the level of viscosity of the polymer at the second viscometer 48 varies appreciably from a targeted norm. To support its operation, the IV data system 72, regularly, at discrete time intervals, such as once per minute informs the computer 80 of the current level of IV of the polymer at the second viscometer 48. Thus, the calculated IV from viscometer 48 is updated at discrete time intervals (such as once per minute), but is maintained continuously at the same value between these time interval updates.

Figure 3:
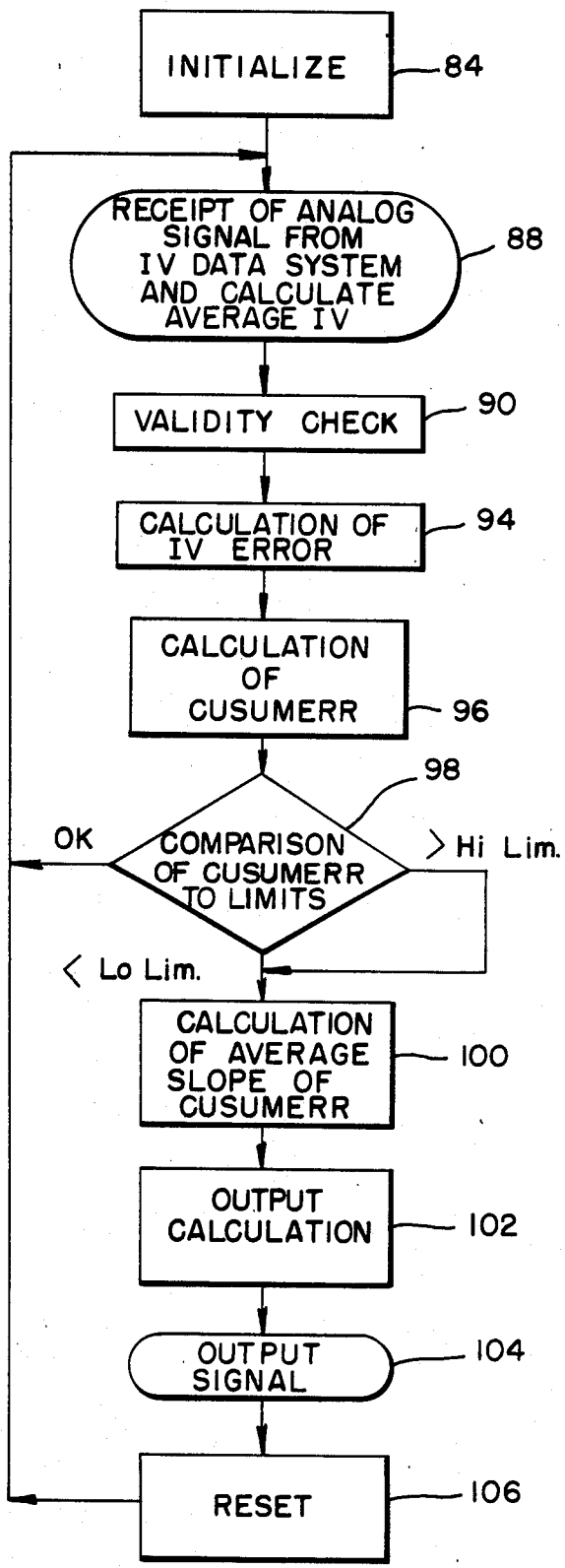
FIG. 3 is a logic flow chart illustrating, serially, functions performed by one of the components of the system illustrated in FIG. 2.

Turn now to FIG. 3 which is a functional flow diagram of the steps performed by computer 80 as it calculates a new set point based on viscosity measurements at the second viscometer 48. At the outset of operation of the computer 80, as represented by a box 84 in FIG. 3 representing the initialization of the sequence of operations, numerous settings are established for the computer. Table 1 presents a listing of those operating conditions initially set into the computer and the nomenclature associated with such operating conditions. Also noted are the initial values of each condition set into the computer and indicating either the magnitude of such initial value or the fact that it is determined by the user, that is, is "user set".

TABLE 1

| Operating Conditions | Initial Value |
|---|---|
| TARGET | = User Set |
| LIMIT | = User Set |
| OUTPUT (automatically adjusted) | = TARGET |
| HILIM | = TARGET + LIMIT |
| LOLIM | = TARGET − LIMIT |
| CUSUMERR, TIMER | = 0 |
| K | = User Set |
| ½ HR. IV AVG. HI & LO LIMITS | = User Set |
| ½ HR. IV AVG. R.O.C. ("Rate of Change") LIMITS | = User Set |

It should be helpful for a complete understanding of the control system 50 to explain in some detail the items recited in Table 1. The TARGET, indicated as being user set, may be manually set by means of a potentiometer as schematically represented by turning a knob 86 on the computer 80. The LIMIT, which represents the allowed variability of IV from the TARGET is also user set. This is performed manually by making an entry into the computer. A typical numerical limit may be for example, 0.010 in the instance where a target is 0.92. In that event, a high limit, denoted "HILIM" would be the sum of the TARGET and the LIMIT, or 0.93 and a low limit, denoted "LOLIM" would be the difference between the TARGET and the LIMIT, or 0.91. The term "CUSUMERR" is a shortened form of "accumulated algebraic sum of error" and represents any buildup of error, that is, excessive variability, of the IV of the second viscometer 48 over a long period of time, no less than a duration of one-half hour and possibly as long as many hours or even several days. Of course, the timer for CUSUMERR would initially be set to zero. "K" is a constant representing a gain factor which enables the system to be tuned so as to assure the effective operation of the process. Finally, average high and low limits as well as average rate of change limits are established by the user for an average IV value over the duration of a half hour.

With the foregoing as background, the remainder of FIG. 3 should be readily understood by way of the following explanation.

At regular time intervals, for example, once per minute, an updated analog signal representing an average value of IV from the second viscometer 48 is transmitted by the IV data system 72 to the computer 80 via an electrical line 82. This occurrence is represented by a box 88 in FIG. 3. As represented by a box 90, a validity check is performed on the analog IV signal to assure that it is not a spurious signal or one which is the result of a problem in the production system 20 which has no direct relation to items with which the control system 50 is concerned. Thus, the validity check assures that the signal representing a one half hour IV average is within predetermined limits. Such predetermined limits are far greater than the limit recited in Table 1 above. For example, an upper limit might be 0.95 and a lower limit might be 0.90. The validity check also determines that the rate of change of the one half hour IV average signal compared with a similar earlier signal is less than a predetermined rate of change limit which has been established. In the event the one half hour IV average signal value is in excess of either of these predetermined limits, the data is ignored and there is no change to the output. That is, no change is made to the continuous signal being sent from the computer 80 via an electrical line 92 to the recorder controller 74.

Following the validity check, a calculation is performed to determine IV error as indicated by a box 94. Specifically, $$ERR = \tfrac{1}{2} \text{ HR. IV AVG.} - \text{TARGET}$$

where "ERR" means error.

As represented by a next box 96, a calculation is performed of the accumulated algebraic sum of error by summing the previously calculated CUSUMERR with the new ERR to obtain an updated CUSUMERR.

A next calculation to be performed is a comparison of the updated CUSUMERR to the HILIM and the LOLIM previously discussed. This calculation is represented by a diamond shaped box 98. In the event the CUSUMERR is either in excess of the HILIM or less than the LOLIM, the operation of the computer 80 proceeds to a successive step indicated by a box 100. In the event the CUSUMERR is less than the HILIM or greater than the LOLIM, that is, the CUSUMERR is within limits, then processing of the most recent one half hour IV average from the second viscometer 48, is completed. In this event no change is made to the signal sent via electrical line 92 to the recorder controller 74.

Assuming, however, that CUSUMERR either exceeds the HILIM, or is less than the LOLIM, the next step, represented by the box 100 is to calculate the average slope of the CUSUMERR based on time. That is, $$\text{slope} = \text{CUSUMERR}/\text{TIMER}$$

TIMER is incremented by one half hour each time one half hour average is computed.

Calculations now proceed to a next step represented by a box 102 for calculating an output from the computer 80 according to a relationship stated as follows:

$$\text{new output} = \text{old output} + K \text{ (slope)}$$

It will be recalled that K is a gain factor or tuning constant set by the operator.

The output signal thus generated is translated from a digital format to an analog format in a step indicated by an oval box 104. The output from the computer 80 may be in the form of a 4-20 milliamp electrical signal transmitted to the recorder controller 74 via the electrical line 92. In the process, certain components and/or values within the computer 80 are reset as indicated by a box 106 in FIG. 3 such that CUSUMERR returns to zero as does the TIMER. The computer 80 is then prepared to compute the next one half hour IV average at the second viscometer 48 by way of the analog signal received from the IV data system 72 (updated once per minute).

Thus, the output from the computer 80 establishes a set point for the recorder controller 74 according to which the process variable of IV is changed as a target, if necessary. Thereafter, at least for the next half hour, signals to the recorder controller 74 from the IV data system 72 representing IV readings at the first viscometer 46 are compared with the new set point thereby altering the output from the recorder controller 74 to the valve 32 by way of controllers 62 and 52. Ideally, after a process change is initiated, there should be a delay for a period of time, one-half hour, for example, before the IV data system 72 informs the computer 80 of the polymer IV level at the second viscometer 48.

Accordingly, it will be appreciated that the system just described utilizes an arrangement according to which adjustments can be made to valve 32 (or to any other appropriate device for altering polymer IV within the vessel 22) on a continuous basis in response either to pressure information received from the pressure transmitter 52 or inferred viscosity measurements received from the computer 60. Additional short term adjustments can be made in accordance with discretely updated continuous signals from the IV data system 72 based on the level of IV as read at the first viscometer 46. Finally, mid term and long term variations of IV can be determined by the computer 80 based on readings of viscosity at the second viscometer 48 to establish new set points and adjust the valve 32 accordingly.

The following examples serve to illustrate the present invention and its best mode, but should not limit the scope of the invention.

EXAMPLE 1

The average IV from a production machine was measured over a two day period utilizing a conventional control system incorporating a capillary viscometer to measure the melt viscosity of the polymer adjacent the manifold leading to the spinnerettes. The measure of melt viscosity was then compared to a target melt viscosity and the difference used to reset the control point on a parameter representative of conditions inside the high polymerizer. In this instance, a measure of the level of the polymer within the vessel was performed by absorption of radioactive particles. This method has been commonly used because the vessel's agitator causes the polymer to climb the walls of the vessel and the higher the climb the higher the apparent level of IV. This signal in turn controls the vacuum applied to the high polymerizer vessel. During the test, the IV was observed to vary in the range of 0.014 IV as calculated on a three hour moving average. The actual variation was significantly higher, being in a range of 0.023 IV from hour to hour. Changes between consecutive determinations were frequently greater than 0.005 IV and changes up to 0.012 IV were observed. During this test, there was no injection of additives such as ethylene oxide.

EXAMPLE 2

A review of the results of Example 1 indicated that there was approximately a 15 minute delay from the time a disturbance occurred to the time that it was detected by the manifold viscometer. To improve the response time of the system, the control viscometer was repositioned at the outlet from the high polymerizer vessel. The manifold viscometer was retained but was not utilized for purposes of control, rather, only for informational purposes. At the same time, agitator torque was substituted for the radioactive level measurement used for Example 1. The IV was measured over a three day period. Additionally, in contrast to Example 1, ethylene oxide was injected to the polymer after the melt viscometer measuring point. In this trial, the IV varied in a range of 0.016 IV grams over a four day period. This variation is indicated by a curve 108 in FIG. 4C. During this period, the IV range was 0.016 compared to 0.023 observed in the two day period of Example 1, or equal significance in this example, the IV variations from hour to hour did not exceed 0.003 compared to greater than 0.005 in Example 1. IV variability as measured at the outlet of the high polymerizer vessel is indicated by a curve 110 in FIG. 4A as compared with a target 112 and was effectively controlled to within +/−0.003 IV units using a control viscometer positioned at the outlet from the high polymerizer. This variation is represented by the distance between arrow heads 114. The IV variability measured in the polymer distribution system downstream from the outlet from the high polymerizer vessel (adjacent the manifold) is indicated by a curve 116 in FIG. 4C and was measured at +/−0.006 units. This variation is represented by the distance between arrow heads 118. However, it was observed that a high degree of correlation existed between the IV as measured by the manifold viscometer and the breakload, the correlation coefficient being 0.8.

During the trial of Example 2, periods of 12-plus hours were observed when the IV in the polymer distribution system did not vary more than +/−0.003 units. In FIG. 4B, the time period between the 36th and the 48th hours is representative of such a condition. During these periods, the IV did not vary by more than +/−0.003. These measurements, then, indicated that if the change or rate of change of IV adjacent the manifold were used to control IV within the high polymerizer vessel, then, long term control of IV to +/−0.003 at the spinning machine or pelletizer would be feasible.

The system described above with the aid of FIGS. 1–3 was devised as a result of the preliminary efforts related in the foregoing Examples 1 and 2.

While the invention has been described in detail and with reference to specific embodiments thereof, it would be apparent to one skilled in the art that various changes and modifications can be made therein without departing from the spirit of the invention which is intended to be limited only by the scope of the appended claims. For example, although the invention as described above is directed toward the process of polymerization followed by melt spinning of fibers, it can be useful as well in a continuous polymerization process conducted in a series of polymerization zones or stages which may be followed by no other process steps, or by different process steps such as melt extrusion of film.

We claim:

1. In a process for the continuous manufacture of synthetic yarns according to which the molten polymer flows continuously from an outlet of a polymerization zone to a spinnerette to form the polymer into filamentary material; the improvement of controlling intrinsic viscosity of the polymer comprising the steps of:

establishing as a set point a magnitude of a meaningful operating condition within the polymerization zone so as to achieve an optimum value of viscosity of the polymer at the outlet of the polymerization zone;

continuously measuring a first value of melt viscosity of the polymer at the outlet from the polymerization zone;

periodically adjusting the magnitude of the meaningful operating condition within the polymerization zone about the set point according to short discrete time interval deviations occurring in the first value of melt viscosity;

periodically measuring deviations occurring during an extended time interval in second values of melt viscosity of the polymer at a location adjacent to the inlet of the further processing step; and periodically resetting the set point when the second values of melt viscosity continue to deviate from the set point by a predetermined amount.

2. A process as set forth in claim 1 wherein the meaningful operating condition is the vacuum within the polymerization zone.

3. A process as set forth in claim 1 wherein the meaningful operating condition is the inventory of the molten polymer within the polymerization zone.

4. A process as set forth in claim 1 wherein the meaningful operating condition is the torque applied to an agitator used for agitating polymer within the polymerization zone.

5. A process as set forth in claim 1 wherein the intrinsic viscosity of the polymer has a standard deviation of +/−0.001 intrinsic viscosity units over a time period exceeding 48 hours.

6. A process as set forth in claim 1 wherein the short time interval is less than 30 minutes duration and the extended time interval is greater than 30 minutes duration.

7. A process as set forth in claim 1 including the steps of:

measuring the meaningful operating condition within the polymerization zone;

measuring the difference between the measured value of the meaningful operating condition and a set point for the operating condition; and adjusting the magnitude of the meaningful operating condition to make it coincident with the set point for the operating condition.

8. A process as set forth in claim 7 wherein all of the steps recited in claim 7 are performed continuously.

9. A process as set forth in claim 1 including the steps of:

computing the inferred viscosity of the polymer within the polymerization zone as a function of a plurality of process variables;

measuring the difference between the computed value of inferred viscosity and a predetermined value of intrinsic viscosity;

adjusting the magnitude of the meaningful operating condition to make it coincident with the set point.

10. A process as set forth in claim 9 wherein each of the steps recited in claim 9 are performed continuously.

11. A process as set forth in claim 1 wherein the step of periodically resetting the set point includes the steps of:

calculating a cumulative sum of the deviations occurring in the second values of melt viscosity during the extended time interval; and periodically resetting the set point when the cumulative sum of the second values for the extended time interval deviates from the set point by a predetermined amount.

12. A process as set forth in claim 1 wherein the polymer is a polyethylene terephthalate polyester.

13. A process as set forth in claim 1 wherein the polymer is a polyester.

14. In a process for the continuous production of polymer according to which the molten polymer flows continuously in a cascade system of successive polymerizer vessels from an outlet of a lower polymerizer vessel to the inlet for a higher polymerizer vessel, the improvement of controlling intrinsic viscosity of the polymer comprising the steps of:

establishing as a set point a magnitude of a meaningful operating condition within the lower polymerizer vessel so as to achieve an optimum value of viscosity of the polymer at the outlet from the vessel;

continuously measuring a first value of melt viscosity of the polymer at the outlet from the lower polymerizer vessel;

periodically adjusting the magnitude of the meaningful operating condition within the lower polymerizer vessel about the set point according to short discrete time interval deviations occurring in the first value of melt viscosity;

periodically measuring deviations occurring during an extended time interval in second values of melt viscosity of the polymer at a location distance from the immediately preceding vessel and adjacent the inlet to the next succeeding higher polymerizer vessel; and periodically resetting the set point when the second values of melt viscosity continue to deviate from the set point by a predetermined amount.

15. A process as set forth in claim 14 wherein the polymer is a polyester.

16. A process as set forth in claim 14 wherein the polymer is a polyethylene terephthalate polyester.

17. In a process for the continuous production of polymer according to which the molten polymer flows continuously from an outlet of a polymerization zone to an operating station downstream from the vessel, the improvement of controlling intrinsic viscosity of the polymer comprising the steps of:

establishing as a set point a magnitude of a meaningful operating condition within the polymerization zone so as to achieve an optimum value of viscosity of the polymer at the outlet from the vessel;

continuously measuring a first value of melt viscosity of the polymer at the outlet from the polymerization zone;

periodically adjusting the magnitude of the meaningful operating condition within the polymerization zone about the set point according to short discrete time interval deviations occurring in the first value of melt viscosity;

periodically measuring deviations occurring during an extended time interval in second values of melt viscosity of the polymer at a location adjacent to the operating station; and periodically resetting the set point when the second values of melt viscosity continue to deviate from the set point by a predetermined amount.

18. A process as set forth in claim 17 wherein the polymer is a polyester.

19. A process as set forth in claim 17 wherein the polymer is a polyethylene terephthalate polyester.

* * * * *